(12) United States Patent
Szafnauer et al.

(10) Patent No.: US 11,879,511 B2
(45) Date of Patent: Jan. 23, 2024

(54) BRAKE ASSEMBLY

(71) Applicant: Meritor Heavy Vehicle Braking Systems (UK) Limited, Cwmbran (GB)

(72) Inventors: Alex Szafnauer, Cwmbran (GB); Sean Cleary, Cwmbran (GB); Tim Smith, Cwmbran (GB); Anthony Williams, Cwmbran (GB); Paul Thomas, Cwmbran (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 98 days.

(21) Appl. No.: 17/674,006

(22) Filed: Feb. 17, 2022

(65) Prior Publication Data

US 2022/0299079 A1  Sep. 22, 2022

(30) Foreign Application Priority Data

Mar. 22, 2021  (EP) .................................. 21164065

(51) Int. Cl.

| F16D 65/18 | (2006.01) |
|---|---|
| F16D 65/095 | (2006.01) |
| F16D 55/227 | (2006.01) |
| F16D 65/00 | (2006.01) |
| F16D 55/00 | (2006.01) |

(52) U.S. Cl.
CPC ......... *F16D 65/095* (2013.01); *F16D 55/227* (2013.01); *F16D 65/0068* (2013.01); *F16D 65/0087* (2013.01); *F16D 2055/0016* (2013.01)

(58) Field of Classification Search
CPC ........... F16D 55/2265; F16D 55/22655; F16D 55/227; F16D 65/095; F16D 65/0068; F16D 65/0087; F16D 65/18; F16D 2055/0016

USPC .......... 188/71.1, 71.7, 72.1–72.4, 72.7, 72.9, 188/73.44, 73.45, 73.46, 156, 158, 161

See application file for complete search history.

(56) References Cited

U.S. PATENT DOCUMENTS

| 2011/0278104 A1* | 11/2011 | Isono ................ F16D 55/22655 188/71.8 |
| 2015/0129371 A1* | 5/2015 | Gutelius ............... F16D 55/228 188/72.1 |
| 2015/0323022 A1 | 11/2015 | Thomas |

(Continued)

FOREIGN PATENT DOCUMENTS

| CN | 105051397 A | 11/2015 |
| CN | 108700146 A | 10/2018 |

(Continued)

OTHER PUBLICATIONS

China Office Action dated Apr. 15, 2023 for related China Application. No. 202210304566.8; 7 Pages.

(Continued)

*Primary Examiner* — Christopher P Schwartz
(74) *Attorney, Agent, or Firm* — Brooks Kushman PC

(57) ABSTRACT

A disc brake assembly having brake pads, a brake carrier, a caliper, and an actuating arrangement. The caliper is slidable with respect to the brake carrier for clamping and release of a rotor by the brake pads. The actuating arrangement is configured to selectively move the caliper and the brake carrier relative to each other generally transverse to a first longitudinal axis so as to lock or inhibit sliding of the caliper relative to the carrier.

17 Claims, 8 Drawing Sheets

(56) References Cited

U.S. PATENT DOCUMENTS

2022/0299073 A1* 9/2022 Cleary ................ F16D 65/095
2022/0299075 A1* 9/2022 Szafnauer ............ F16D 55/227

FOREIGN PATENT DOCUMENTS

| DE | 4203318 A1 | | 8/1993 | |
|----|------------|---|--------|---|
| DE | 10143805 A1 | | 4/2003 | |
| EP | 3193035 A1 | | 7/2017 | |
| EP | 3296585 A1 | * | 3/2018 | ......... F16D 55/2265 |

OTHER PUBLICATIONS

Extended European Search Report dated Aug. 20, 2021 for related application No. 21164065.1: 7 Pages.

\* cited by examiner

BRAKE ASSEMBLY

TECHNICAL FIELD

The present teachings relate to a brake assembly for a heavy commercial vehicle.

BACKGROUND

Commonly, air-actuated heavy-vehicle disc brakes include a brake carrier, a brake caliper, an inboard brake pad and an outboard brake pad. In use, the brake carrier straddles a brake rotor and the brake pads are positioned on opposing sides of the brake rotor. Typically, the brake caliper is arranged to freely slide on guide pins relative to the brake carrier, and the brake pads are secured to the brake caliper. As such, during a braking operation, under the action of a brake actuator, the brake pads can move relative to the brake carrier, such that friction material on each brake pad contacts the brake rotor.

Outside of a braking operation, the brake actuator is released, and the brake pads are typically 'pushed' away from the rotor back to a rest position due to the rotor being slightly uneven or having a degree of runout. However, at least one of the brake pads may contact the brake rotor unintentionally. Such unintentional contact between the brake pads and the brake rotor may be caused by, for example, engine vibration or cornering forces. Contact between the brake rotor and the brake pads outside of a braking operation can lead to lower vehicle efficiency and higher fuel consumption, as well as reducing the life of the brake pads due to increased wear of the friction material.

Existing systems for positive pad retraction can help to ensure that the brake pads are pushed away from the rotor after a brake operation, but they are typically located in an intermediate position between the inboard and outboard brake pads so cannot account for differential brake pad and rotor wear, when the inboard and outboard brake pads, and opposite surfaces of the rotor, wear at different rates. Such positive pad retraction systems are also difficult to align and locate, due to, for example, machining tolerances.

The present teachings seek to overcome, or at least mitigate the problems of the prior art.

SUMMARY

According to a first aspect, there is provided a disc brake assembly for a heavy commercial vehicle. The disc brake assembly comprises: first and second brake pads arranged to face opposing faces of a brake rotor; a brake carrier arranged to receive at least the first brake pad; a caliper arranged to slide with respect to the brake carrier for clamping and release of the rotor by the brake pads along a first longitudinal axis; and an actuating arrangement configured to selectively move the caliper and the brake carrier relative to each other generally transverse to the first longitudinal axis so as to lock or inhibit the sliding of the caliper relative to the carrier.

Advantageously, since the actuating arrangement can selectively lock or inhibit the caliper and the brake carrier from sliding relative to each other, the actuating arrangement may be used to stop the caliper sliding relative to the brake carrier outside of a braking operation when there is a desired running clearance between the brake pad and a brake rotor. As such, the actuating arrangement can help to prevent the brake pad from contacting the brake rotor unintentionally.

Moreover, when the actuating arrangement is operated to lock or inhibit relative sliding between the caliper and the brake carrier, the actuating arrangement may also act to dampen undesirable vibrational effects, such as a rattling sound caused by components of the disc brake assembly abutting against each other due to engine vibration for example.

The actuating arrangement may be mounted to a mounting portion of one of the caliper and the brake carrier. The actuating arrangement may be configured to engage an engagement portion of the other of the caliper and the brake carrier.

This allows the actuator to move the caliper and the brake carrier relative to each other via suitable engagement of the actuator with the engagement portion.

The actuating arrangement may be configured to move the mounting portion and the engagement portion away from each other in a first mode of operation. The actuating arrangement may be configured to move the mounting portion and the engagement portion towards each other in a second mode of operation.

Advantageously, by moving the mounting portion and the engagement portion towards or away from each other, the orientation of the caliper relative to the brake carrier can be varied. This may allow the friction between components of the brake carrier and the caliper and/or components secured to the brake carrier and the caliper to be controlled so as to lock or inhibit the sliding of the caliper relative to the carrier.

The actuating arrangement may be configured to apply an increasing compressive force to the engagement portion in the first mode of operation and a decreasing compressive force to the engagement portion in the second mode of operation.

The actuating arrangement may be configured to apply an increasing tensile force to the engagement portion in the first mode of operation and a decreasing tensile force to the engagement portion in the second mode of operation.

The engagement portion may extend a distance in an axial direction, said distance sufficient to allow the actuating arrangement to engage the engagement portion across all wear conditions of the brake pads.

The engagement portion may be a surface of one of the caliper and the brake carrier having a substantially constant profile in the axial direction.

The engagement portion may be a planar surface of one of the caliper and the brake carrier.

Advantageously, this may allow the actuating arrangement to apply a consistent force to the engagement portion irrespective of the wear conditions of the brake pads.

The disc brake assembly may comprise a first caliper guide assembly and a second caliper guide assembly. The caliper guide assemblies may be configured such that the caliper can slide with respect to the brake carrier along the first longitudinal axis. The mounting portion and the engagement portion may intersect a plane, said plane parallel to and substantially centrally between the first and the second caliper guide assemblies.

Advantageously, this may help to reduce wear of the caliper guide assemblies by ensuring that frictional forces are distributed evenly when the actuating arrangement moves the brake carrier and the caliper relative to each other.

The brake carrier may comprise an inboard carrier portion and an opposite outboard carrier portion. The caliper may comprise an inboard caliper portion and an opposite outboard caliper portion. The disc brake assembly may include a caliper guide assembly comprised in and/or mounted to the inboard carrier portion and the inboard caliper portion. The caliper guide assembly may be configured such that the caliper can slide with respect to the brake carrier along the first longitudinal axis. One of the outboard caliper portion and the outboard carrier portion may comprise the mounting portion. The other of the outboard caliper portion and the outboard carrier portion may comprise the engagement portion.

Advantageously, this may help reduce the tensile/compressive forces required to be imparted by the actuating arrangement to the engagement portion in order to inhibit relative sliding between the caliper and the brake carrier due to the greater moment arm between the engagement portion and the caliper guide assembly.

The caliper may comprise a first guide bore extending along the first longitudinal axis. The disc brake assembly may comprise a first guide pin secured to the brake carrier. The first guide pin may extend along a second longitudinal axis and be received within the first guide bore. The first guide bore and the first guide pin may be configured such that the caliper is slidable relative to the brake carrier when the first longitudinal axis is substantially aligned with the second longitudinal axis. The actuating arrangement may be configured to move the caliper and the brake carrier relative to each other between a first configuration in which the first longitudinal axis and the second longitudinal axis are substantially aligned, and a second configuration in which the first longitudinal axis and the second longitudinal axis are unaligned. The caliper and the brake carrier may be locked or inhibited from sliding relative to each other in the second configuration.

In the second configuration, relative sliding between the caliper and the brake carrier may be inhibited due to sufficient frictional forces between the guide bore and the guide pin.

The actuating arrangement may be secured within a recess in the caliper or the brake carrier.

The actuating arrangement may be bolted to or press-fitted within the recess.

Advantageously, this may help to provide a compact design of the brake assembly.

The actuating arrangement may be a linear actuator.

This provides a simple and efficient means for applying a tensile and/or a compressive force to the engagement portion.

The linear actuator may be an electronic linear actuator.

The linear actuator may be a screw-driven linear actuator.

Advantageously, this may provide a robust and consistent means for moving the brake carrier relative to the caliper.

The caliper may comprise a second guide bore, the second guide bore extending along a third longitudinal axis. The brake assembly may further comprise a second guide pin secured to the brake carrier, the second guide pin extending along a fourth longitudinal axis and received in the second guide bore. The third longitudinal axis and the fourth longitudinal axis may be substantially aligned in the first configuration and unaligned in the second configuration.

According to a second aspect there is provided a method for inhibiting relative sliding between the caliper and the brake carrier of the brake assembly according to the first aspect. The method comprises the steps of: activating the actuating arrangement to move the caliper and the brake carrier relative to each other from a first configuration, in which the caliper is free to slide relative to the carrier along the first longitudinal axis, to a second configuration, in which the caliper is locked or inhibited from sliding relative to the carrier.

The method may further comprise the steps of: activating the actuating arrangement to move the caliper and the brake carrier relative to each other from the second configuration to the first configuration.

BRIEF DESCRIPTION OF THE DRAWINGS

Embodiments are now disclosed by way of example only with reference to the drawings, in which.

DETAILED DESCRIPTION

Figure 1:
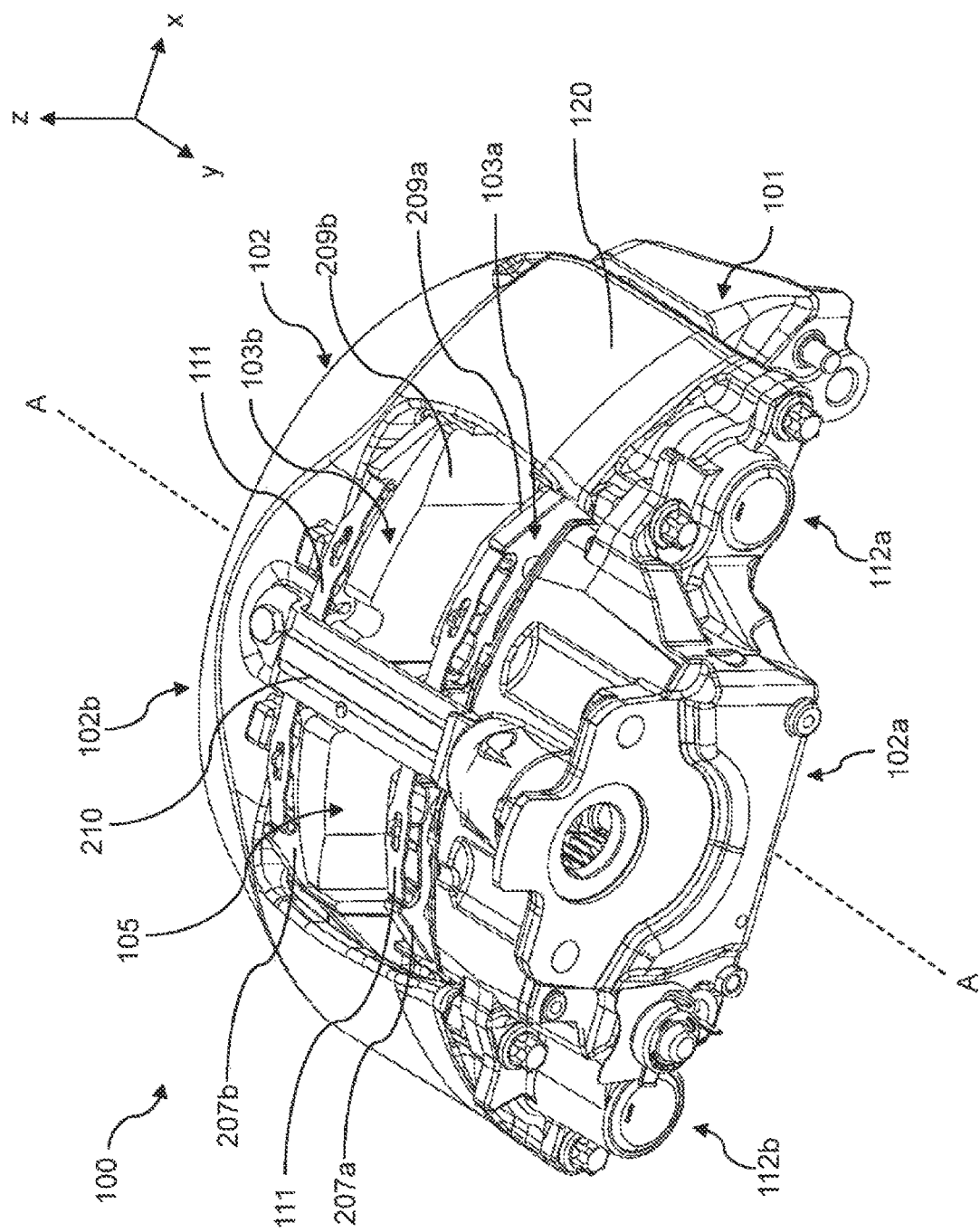
FIG. 1 is an upper isometric view of a brake assembly according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIGS. 1 to 7 show a disc brake assembly 100 for a heavy commercial vehicle according to an embodiment. The disc brake assembly 100 includes a caliper 102 slidably mounted with respect to a brake carrier 101 by two guide assemblies 112a and 112b. The caliper 102 has a housing 120 typically formed from cast iron or steel. The carrier 101 is typically also formed from cast iron or steel. The caliper 102 includes an inboard caliper portion 102a and an opposite outboard caliper portion 102b (sometimes referred to as a caliper bridge).

Figure 5:
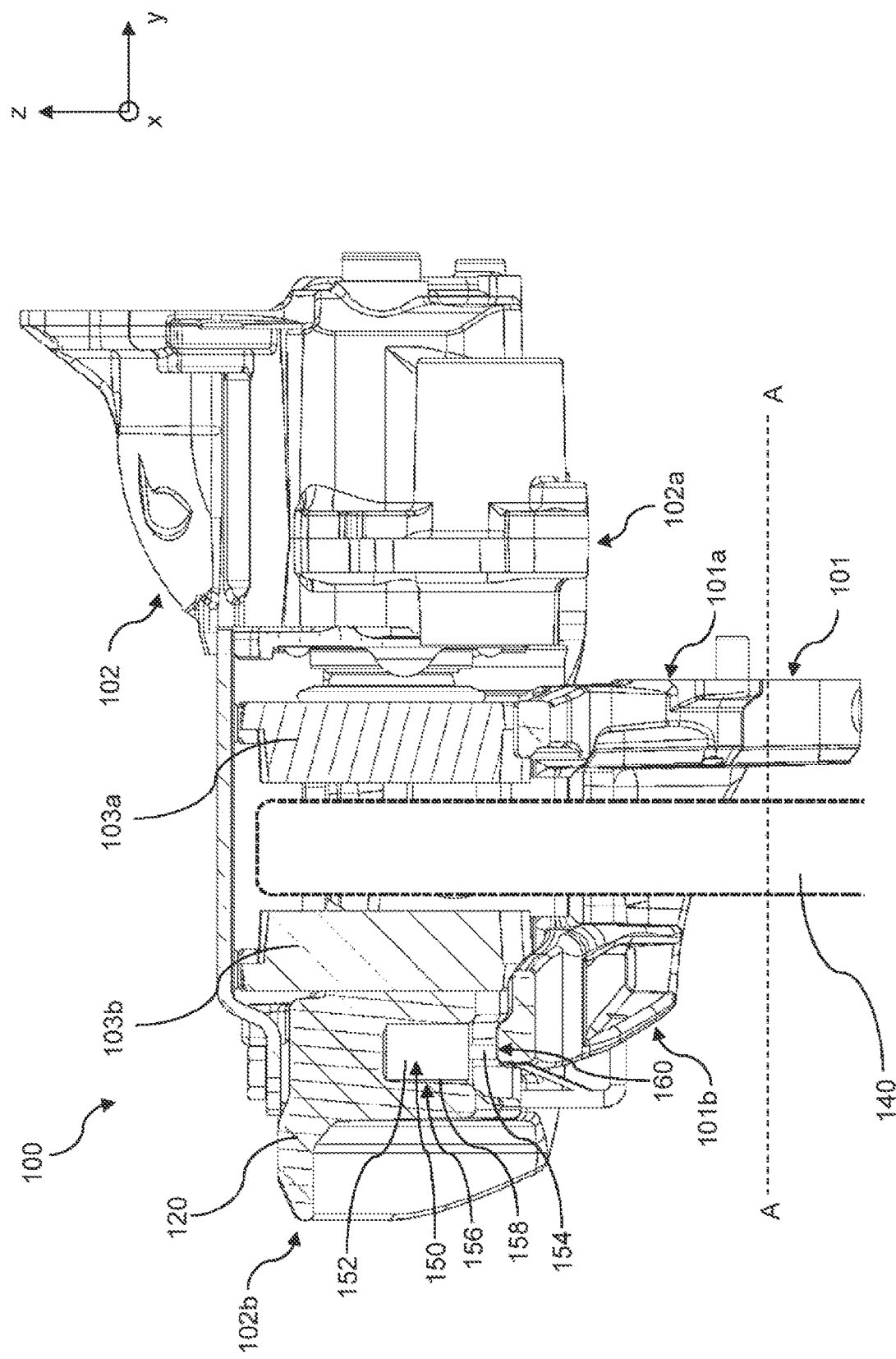
FIG. 5 is a partial cross-sectional view of the brake assembly of FIG. 1 in the y-z plane in the first configuration showing the actuator.

The brake carrier 101 carries an inboard brake pad 103a on an inboard carrier portion 101a, and an outboard brake pad 103b an outboard carrier portion 101b (see FIG. 5).

A rotor 140 (see FIGS. 2, 5 and 6), rotatable about an axis extending in an inboard-outboard axial direction A-A, is rotationally fixed relative to a hub of a wheel of the vehicle (not shown) and positioned between the brake pads 103a, 103b. An air actuator (not shown) is provided to move the inboard brake pad 103a into frictional contact with the rotor 140 via an actuation mechanism 122 (see FIG. 2) housed within the caliper housing 120 and which acts on the inboard brake pad 103a.

In alternative embodiments (not shown), the brake carrier 101 may only receive one of the inboard brake pad 103a or the outboard brake pad 103b. For example, the outboard brake pad 103b may be received in the caliper 102.

The inboard brake pad 103a includes a backplate 207a that supports friction material 209a which is mounted to the backplate 207a. The outboard brake pad 103b includes a backplate 207b that supports friction material 209b which is mounted to the backplate 207b.

During a braking operation, when the inboard brake pad 103a is pushed towards and contacts the rotor 140, the caliper 102 is then caused to slide inboard along first and second caliper guide assemblies 112a and 112b. As the caliper 102 slides inboard, it moves the outboard brake pad 103b towards the rotor 140. Hence, the rotor 140 becomes clamped between the inboard and outboard brake pads 103a, 103b and the rotation of the rotor 140 is frictionally inhibited.

The caliper 102 defines an aperture 105 arranged to receive the brake carrier 101 and the brake pads 103a, 103b as shown in FIG. 1. Advantageously, the aperture 105 enables the inboard brake pad 103a and the outboard brake pad 103b to be installed and removed in a radial direction, with the rotor 140 in place.

During a braking operation, it is desirable for the inboard brake pad 103a and the outboard brake pad 103b to be located equidistant from the rotor 140, to help ensure that the inboard brake pad 103a and the outboard brake pad 103b and both sides of the rotor 140 wear as evenly as possible over the life of the disc brake assembly 100.

As the friction material 209a of the inboard brake pad 103a, the friction material 209b of the outboard brake pad 103b and the rotor 140 wear over the life of the disc brake assembly 100, an adjustment mechanism (well-known and not described in detail) is configured to advance the inboard brake pad 103a towards the rotor 140 during a braking operation if the clearance between the inboard brake pad 103a and the rotor 140 is greater than desired. The adjustment occurs until the friction material 209a of the inboard brake pad 103a contacts the surface of the rotor 140, at which point the adjustment is stopped.

When the disc brake assembly 100 is released at the end of the braking operation, the inboard brake pad 103a and the outboard brake pad 103b move away from the rotor 140, such that there is an inboard pad clearance and an outboard pad clearance.

As will be described in more detail below, in this embodiment, the disc brake assembly 100 includes an actuating arrangement 150 which helps to maintain the inboard pad clearance and the outboard pad clearance outside of a braking operation by inhibiting relative movement between the caliper 102 and the brake carrier 101, which inhibits relative movement between the inboard brake pad 103a, the outboard brake pad 103b and the rotor 140.

A pad strap 210 is arranged to extend over the aperture 105 in an axial direction to help retain the inboard brake pad 103a and the outboard brake pad 103b. In this embodiment, the pad strap 210 is fixed to the housing 120 at the inboard side of the disc brake assembly 100 and can be bolted to the caliper 102 at the outboard side of the disc brake assembly 100 to retain the inboard brake pad 103a and the outboard brake pad 103b, but other known retention arrangements may be used. Due to the aperture 105, the inboard brake pad 103a and the outboard brake pad 103b can be assembled in the disc brake assembly 100 in a radial direction relative to the rotor 140. For example, this enables the inboard brake pad 103a and the outboard brake pad 103b to be removed and replaced when fully worn without the disc brake assembly 100 being disassembled and/or the rotor 140 being removed.

The inboard brake pad 103a further comprises a pad spring 111 arranged between the backplate 207a of the inboard brake pad 103a and the pad strap 210. Specifically, the backplate 207a of the inboard brake pad 103a includes radially extending projections that engage corresponding recesses in the pad spring 111.

The outboard brake pad 103b further comprises a pad spring 111 arranged between the backplate 207b of the outboard brake pad 103b and the pad strap 210. The backplate 207b of the outboard brake pad 103b includes radially extending projections that engage corresponding recesses in the pad spring 111.

The pad springs 111 act to help bias the inboard brake pad 103a and the outboard brake pad 103b in the radial inward direction and help to dampen their movement, to help prevent rattling of the components in use. In other embodiments, other known biasing arrangements may be utilized.

Figure 2:
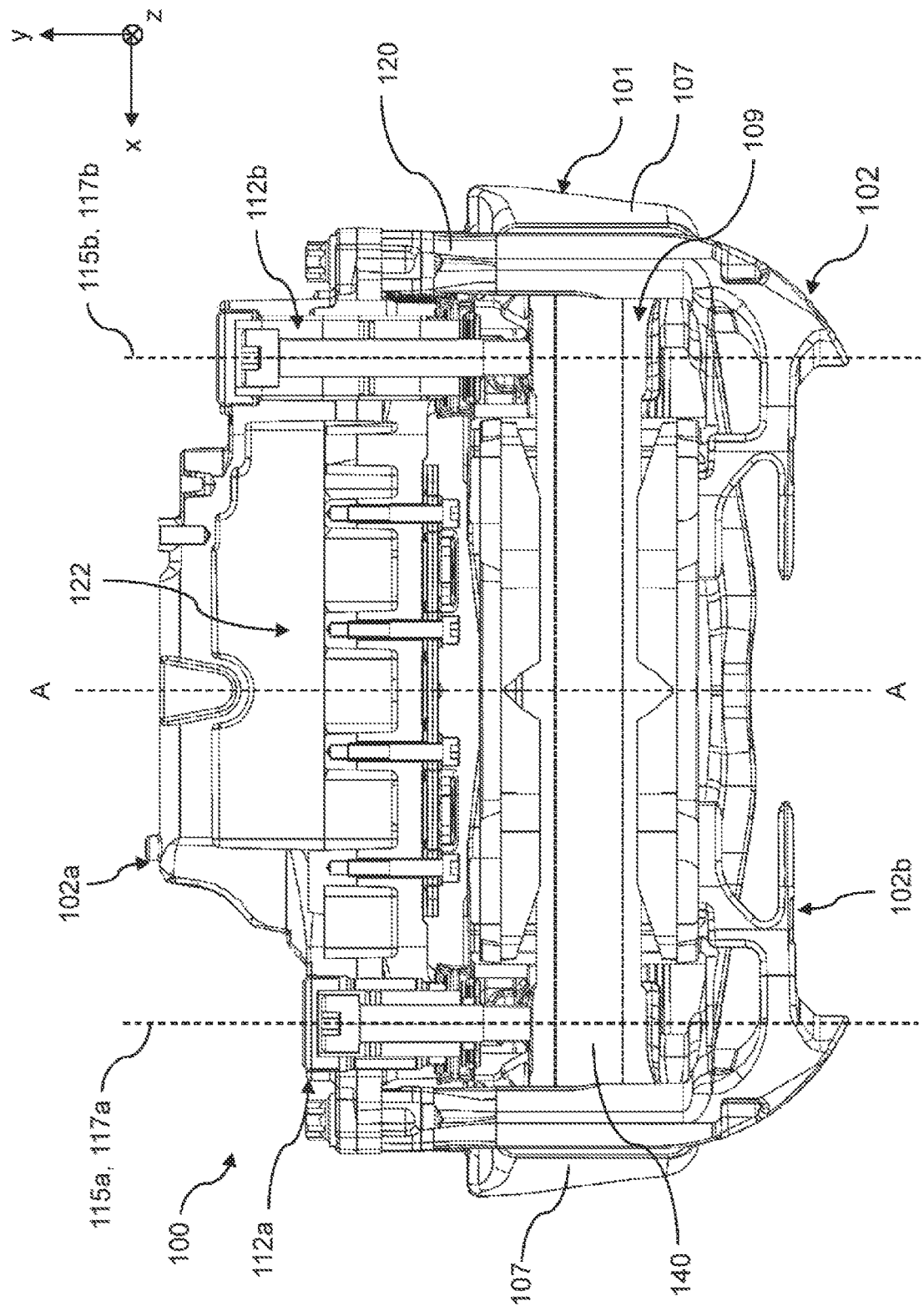
FIG. 2 is a cross-sectional view of the brake assembly of FIG. 1 in the x-y plane in the first configuration.

It can be seen in FIG. 2 that the second guide assembly 112b is longer than the first guide assembly 112a. Otherwise, the first guide assembly 112a is substantially the same as the second guide assembly 112b. As such, only the first guide assembly 112a will be discussed in detail in the following.

In alternative embodiments (not shown), the first guide assembly 112a and the second guide assembly 112b may have the same length.

Figure 3:
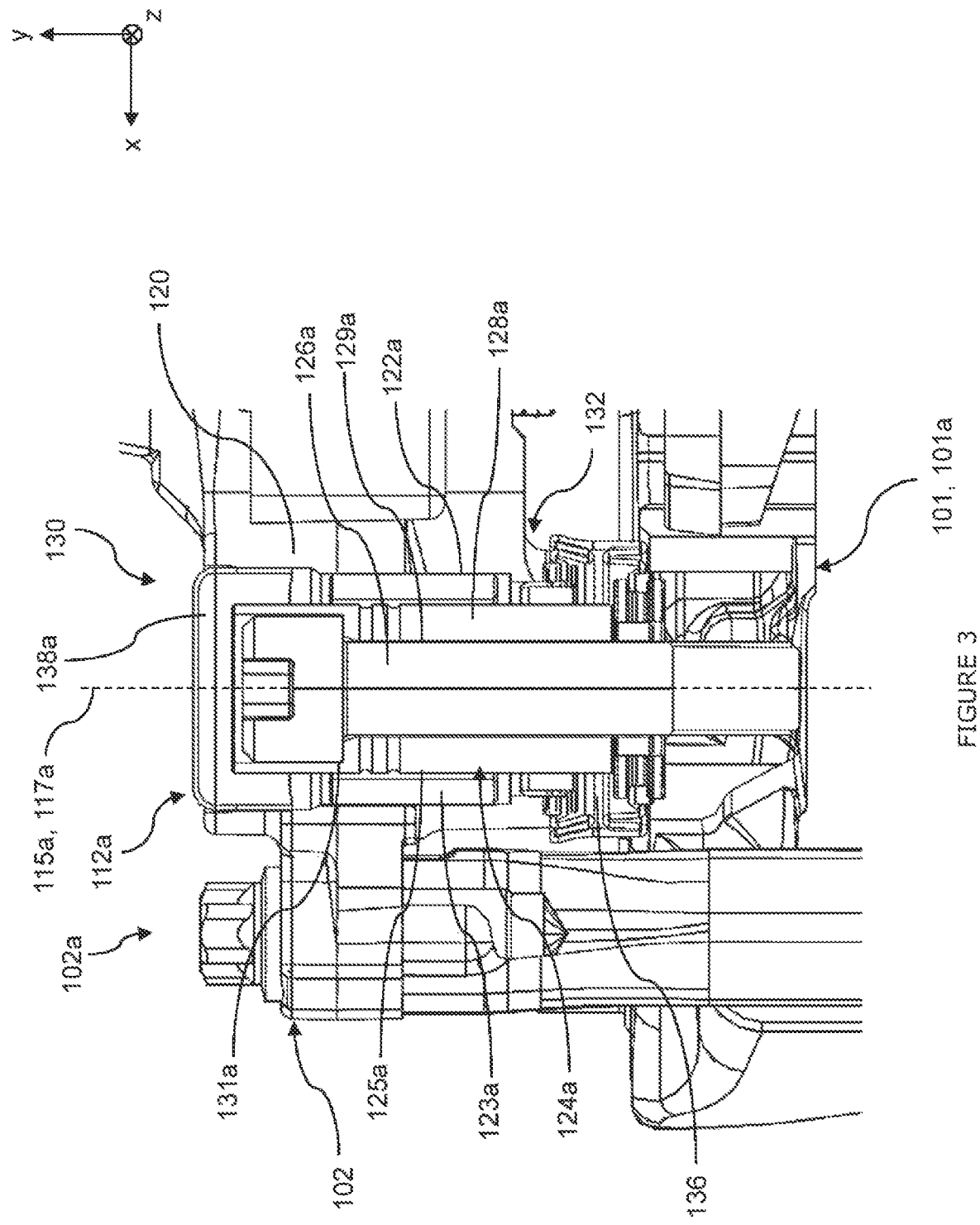
FIG. 3 is a magnified view of FIG. 2 showing the first guide assembly in the first configuration.

With reference to FIG. 3, the first guide assembly 112a comprises a bore 122a extending through the caliper housing 120 along a first longitudinal axis 115a, which is parallel to the axis A-A in FIG. 3. The bore 122a is located in the inboard caliper portion 102a. Hereinafter, any direction which is parallel to axis A-A shall be referred to as the axial direction.

In this embodiment, the bore 122a has a circular cross-sectional profile and receives a guide pin 124a with a circular outer profile and at least one guide bush 123a with a circular outer profile to guide the guide pin 124a within the bore 122a.

The bush 123a is configured to form a close fit with the bore 122a and act as an inner liner in the bore 122a. For heavy vehicle applications the internal diameter of the bush 123a is typically in a range of 25-40 mm. As can be seen in FIG. 2, the bush 123a does not extend the full depth of the bore 122a.

The bush 123a may be manufactured from steel, bronze, plastic, rubber, or a composite of any of these, and may include a low friction coating such as PTFE. The bush 123a may have a plain inner surface or a suitable pattern of depressions to assist in the sliding of the caliper and the retention of lubricants.

The guide pin 124a extends along a second longitudinal axis 117a. In FIGS. 2 and 3, the first longitudinal axis 115a and the second longitudinal axis 117a are coincident and thus are aligned with each other.

The bore 112a and the guide pin 124a are configured such that the caliper 102 is slidable relative to the carrier 101 along the first longitudinal axis 115a when the first longitudinal axis 115a is substantially aligned with the second longitudinal axis 117a. This is achieved by providing a sufficient clearance between the bush 123a and an external surface 125a of the guide pin 124a.

The guide pin 124a comprises a fastener 126a to secure the guide pin 124a to the inboard carrier portion 101a of the brake carrier 101. In the illustrated embodiment, the fastener 126a is a bolt that affixes to the brake carrier 101 by screwing into a threaded bore in the brake carrier 101.

The guide pin 124a further comprises a guide sleeve 128a substantially surrounding the fastener 126a. In this embodiment, the sleeve 128a is a hollow tube with a substantially circular cross-sectional profile. The sleeve 128a includes a central bore 129a within which the fastener 126a is received. A head portion 131a of the central bore 129a is stepped so that the fastener 126a is able to hold the sleeve 128a in place when tightened on to the carrier 101.

The bore 122a of the first guide assembly 112a is an elongate hole extending from a first (inboard) side 130 to a second (outboard) side 132 of the caliper housing 120. The caliper 102 is slidably mounted with respect to the brake carrier 101 by sliding the guide pin 124a through the bore 122a. Hence, when the disc brake is actuated, the caliper 102 is able to slide in the axial direction A-A along the guide pin 124a.

A convoluted bellows-type seal 136 encircles the guide pin 124a and connects to the carrier 101 and caliper 102 to protect the guide assembly 112a from contamination.

In order to further inhibit the contamination of the caliper guide assembly 112a, a cap or cover 138a, which is arranged to close an opening of the guide bore 122a, is secured to the inboard end 130 of the bore 122a. The cap 138a is formed from metal and press-fitted into the end of the bore 122a. However, in alternative embodiments (not shown), the cap 138a may be partially or wholly formed from a different material such as a plastics material for example.

Figure 4:
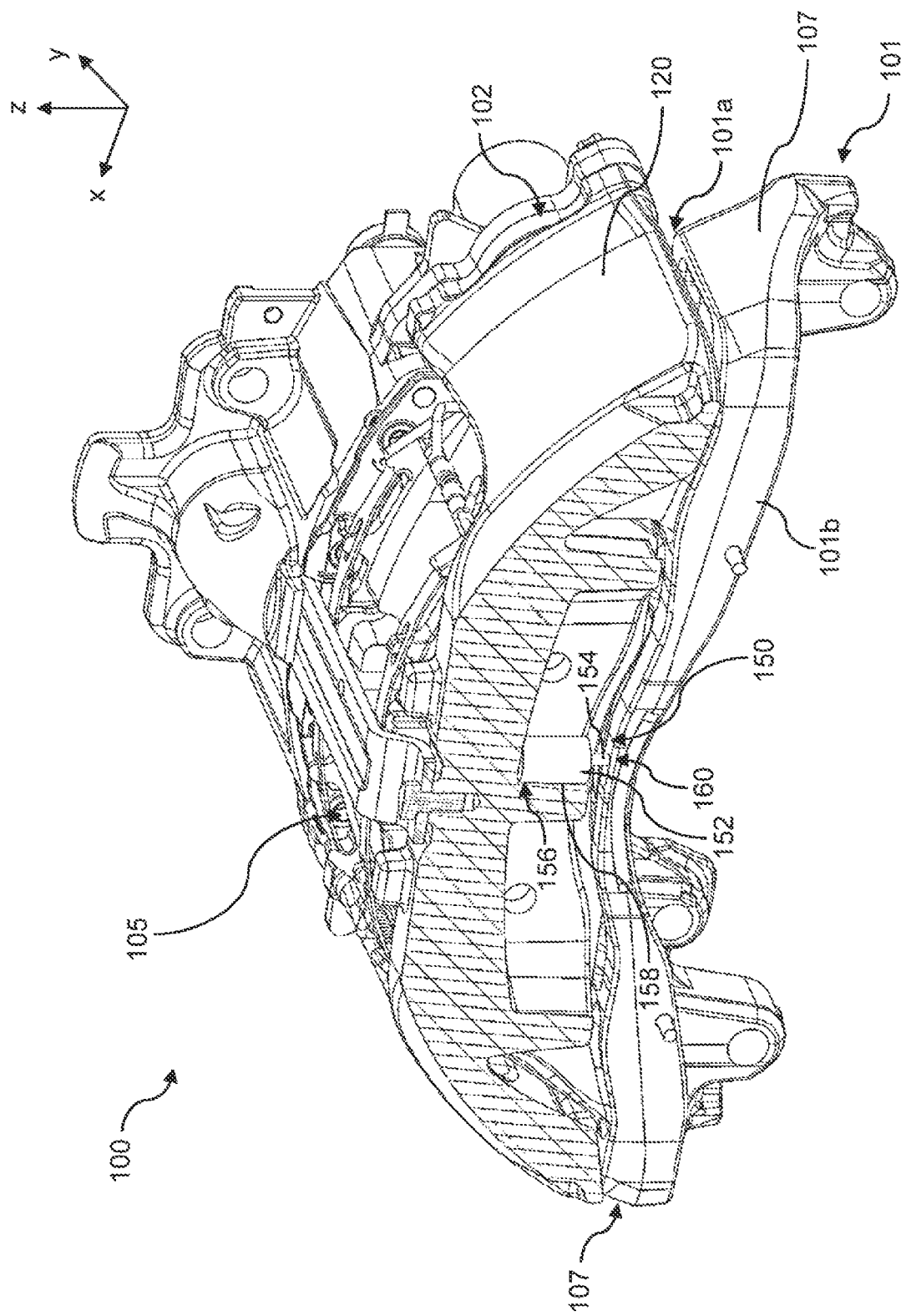
FIG. 4 is an upper isometric view of the brake assembly of FIG. 1 with a portion of the caliper removed to show an actuator.
Figure 6:
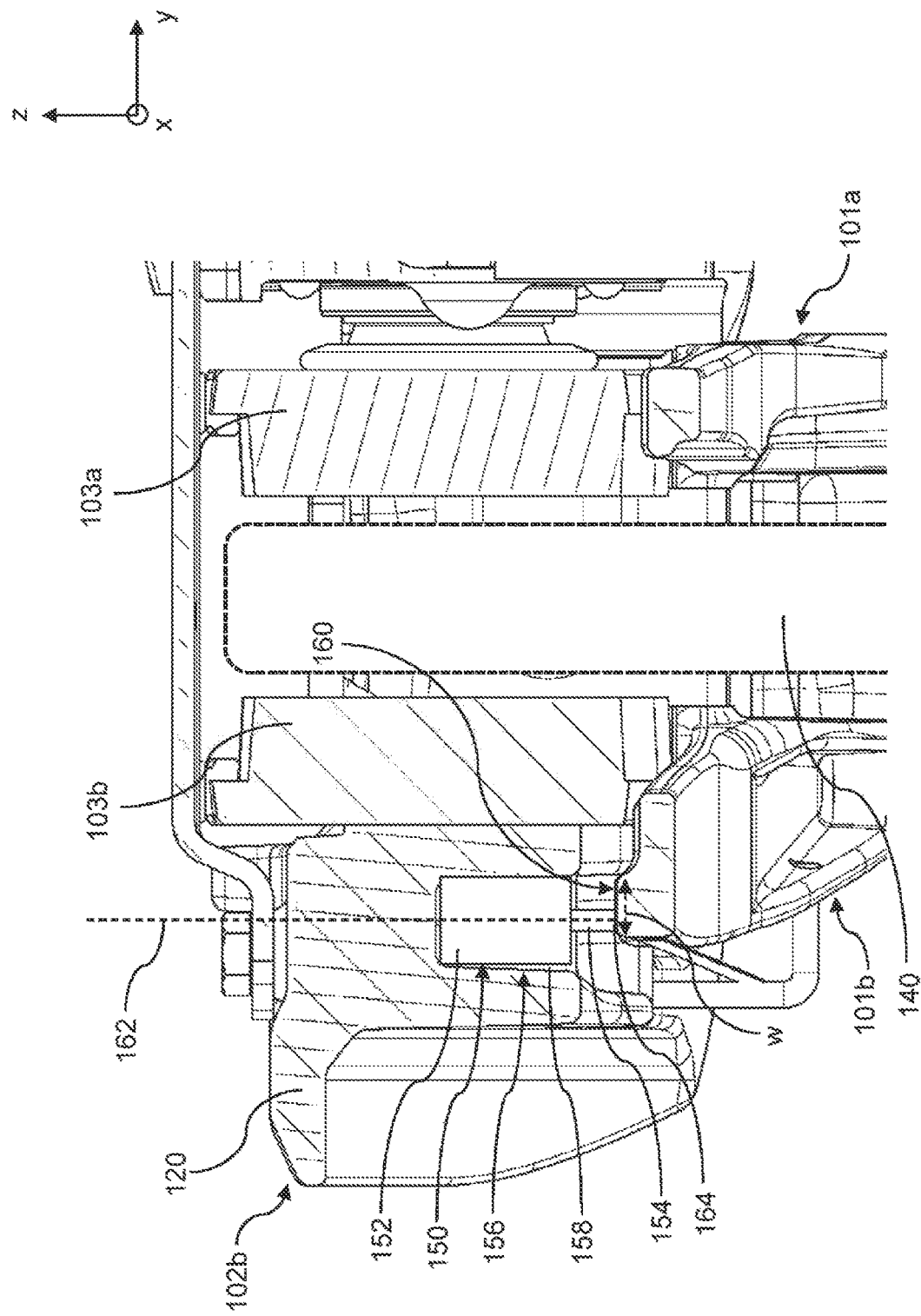
FIG. 6 is a magnified view of FIG. 5 showing the actuator.

With reference to FIGS. 4 to 6, the brake assembly 100 includes an actuating arrangement 150 which is configured to move the caliper 102 and the brake carrier 101 relative to each other in a direction generally transverse to the first longitudinal axis 115a and the second longitudinal axis 117a. The actuating arrangement 150 includes a body 152 and a shaft 154 extending from the body 152.

In the illustrated embodiment, the actuating arrangement 150 is an electronic linear actuator, in particular a screw-driven linear actuator of a type known in the art. The body 152 houses an electric motor, which when activated, causes the shaft 154 to move linearly relative to the body 152 along the axis 162 shown in FIG. 6.

In alternative embodiments (not shown), the actuating arrangement 150 may be a pneumatic or hydraulic linear actuator, or any suitable electronic linear actuator. Alternatively, the actuating arrangement 150 may not be a linear actuator. For example, the actuating arrangement 150 may be a rotary actuator configured to rotate a member relative to the body 152 in the x-z plane in the figures.

In the illustrated embodiment, the actuating arrangement 150 is mounted to a mounting portion 156 of the caliper housing 120, and the actuating arrangement 150 is configured to engage an engagement portion 160 of the brake carrier 101.

The mounting portion 156 is located in the outboard caliper portion 102b of the caliper 102 and comprises a recess 158 formed in the caliper housing 120. As shown in FIGS. 5 and 6, the actuating arrangement 150 is secured within the recess 158 by press-fitting the body 152 of the actuating arrangement 150 within the recess 158.

In alternative embodiments (not shown), the actuating arrangement 150 may be mounted to the mounting portion 156 via any suitable means, such as via mechanical fasteners (e.g., bolts) or via bonding for example. In some alternative embodiments, the actuating arrangement 150 may not be secured within the recess 158 and may instead be secured to an external surface of the caliper 102.

In the illustrated embodiment, substantially all of the body 152 of the actuating arrangement 150 is located within the recess 158, and the shaft 154 extends out of the recess 158. However, in alternative embodiments (not shown), at least a portion of the body 152 may be located outside of the recess 158.

It can be seen in FIG. 4 that the volume of the recess 158 is larger than the volume of the actuating arrangement 150. As shown in FIGS. 5 and 6, the body 152 is secured within the recess 158 once press-fitted via frictional contact between the body 152 and two opposing walls that define the recess 158.

In alternative embodiments (not shown), the recess 158 may be shaped to correspond to the shape of the body 152 such that the volume of the recess 158 is substantially the same as the volume of the body 152.

The engagement portion 160 is located in the outboard carrier portion 101b of the carrier 101. In the illustrated embodiment, the engagement portion 160 is a surface of the outboard carrier portion 101b which is located outboard of the outboard brake pad 103b.

As shown in FIGS. 4 to 6, a distal end 164 of the shaft 154 of the actuating arrangement 150 is arranged to abut against the engagement portion 160.

In alternative embodiments (not shown), the engagement portion 160 may be located on the inboard carrier portion 101a and the mounting portion 156 may be located on the inboard caliper portion 102a.

In the following, a method for inhibiting relative sliding between the carrier 101 and the caliper 102 will be discussed.

In a first step, the carrier 101 and the caliper 102 are in a first configuration in which the first longitudinal axis 115a of the bore 122a and the second longitudinal axis 117a of the guide pin 124a are substantially aligned as shown in FIGS. 2 and 3. As such, the caliper 102 is free to slide relative to the carrier 101.

In a subsequent step, the actuating arrangement 150 is operated in a first mode of operation.

In the first mode of operation, the actuating arrangement 150 is configured to move the mounting portion 156 of the caliper 102 and the engagement portion 160 of the carrier 101 away from each other. This is achieved by activating the actuating arrangement 150 such that the shaft 154 moves linearly along the axis 162 towards the engagement portion 160. With the distal end 164 of the shaft 154 abutting against the engagement portion 160, movement of the shaft 154 towards the engagement portion 160 results in the actuating arrangement 150 applying an increasing compressive force to the engagement portion 160.

By "compressive force" it is meant a force applied to the engagement portion 160 by the actuating arrangement 150 in a direction from the actuating arrangement 150 to the engagement portion 160.

As the compressive force applied by the actuating arrangement 150 to the engagement portion 160 increases, the mounting portion 156 of the caliper 102 and the engagement portion 160 of the carrier 101 are moved away from each other. Since the bore 122a is formed in the caliper 102 and the guide pin 124a is mounted to the carrier 101, movement of the mounting portion 156 and the engagement portion 160 away from each other results in the relative positions of the first longitudinal axis 115a of the bore 122a and the second longitudinal axis 117a of the guide pin 124a changing.

Figure 7:
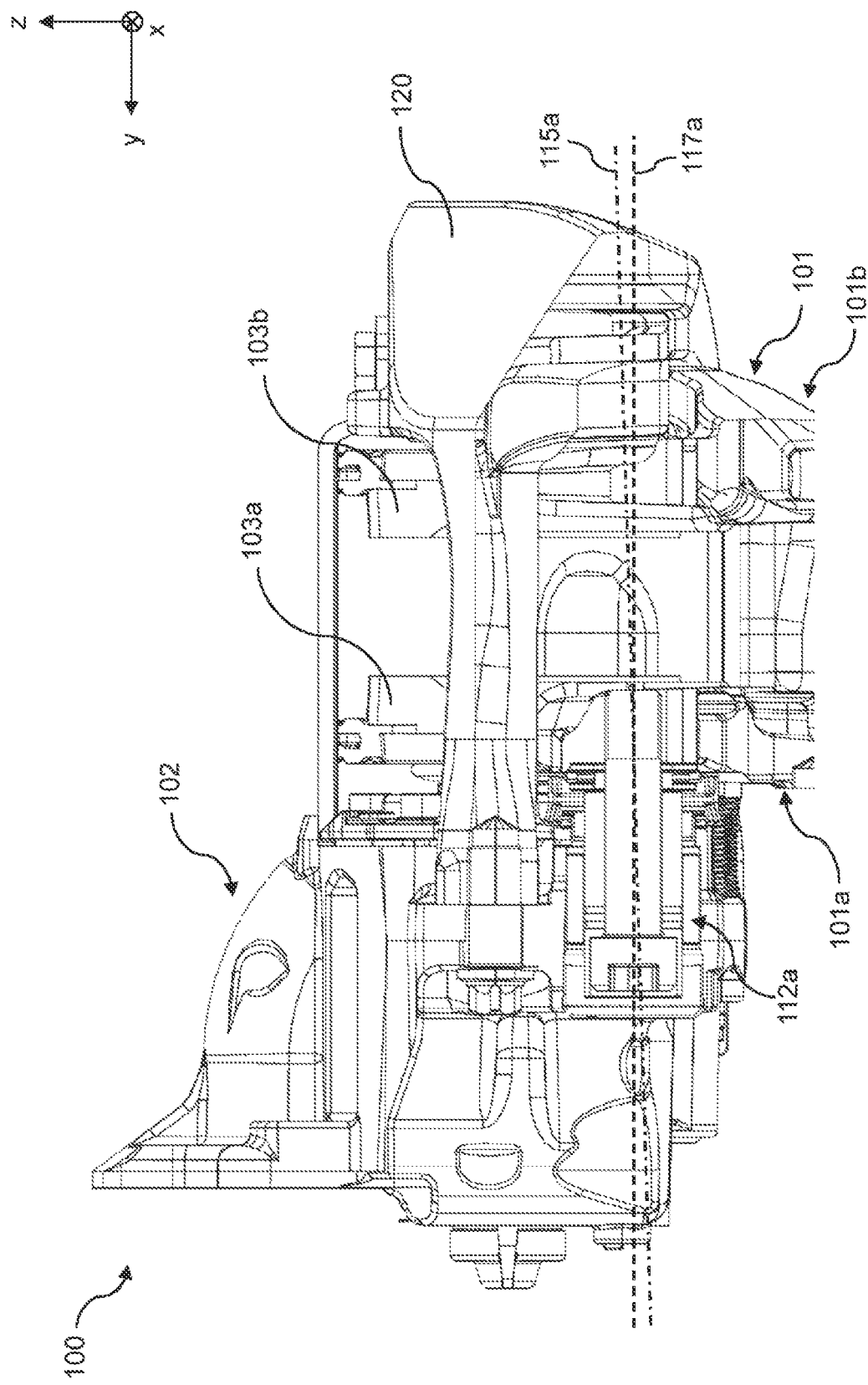
FIG. 7 is a cross-sectional view of the brake assembly of FIG. 1 in the y-z plane in the second configuration showing the first caliper guide assembly.

The actuating arrangement 150 is deactivated when the carrier 101 and the caliper 102 are in a second configuration in which the first longitudinal axis 115a of the bore 122a and the second longitudinal axis 117a of the guide pin 124a are unaligned as shown in FIG. 7. Note that in FIG. 7, the first longitudinal axis 115a is represented by a dash-dot line and the second longitudinal axis 117a is represented by a dashed line. Further, in FIG. 7, the relative positions of the first longitudinal axis 115a and the second longitudinal axis 117a are exaggerated for clarity.

As shown in FIG. 7, the first longitudinal axis 115a and the second longitudinal axis 117a are not coincident. Instead, the first longitudinal axis 115a and the second longitudinal axis 117a are oriented at a non-zero angle relative to each other.

In the second configuration, there is zero clearance between portions of the guide pin 124a and the bush 123a due to the misalignment of the first longitudinal axis 115a and the second longitudinal axis 117a. The frictional forces between the portions of the guide pin 124a and the bush 123a that are in contact with each other are sufficient to inhibit relative sliding between the carrier 101 and the caliper 102.

More specifically, by "inhibit relative sliding between the carrier 101 and the caliper 102", it is meant that the forces that need to be applied to the brake carrier 101 and/or the caliper 102 to overcome the frictional forces between the guide pin 124a and the bore 122a are greater than the forces exerted on the brake carrier 101 and/or the caliper 102 during normal operation, for example during cornering maneuvers.

In a subsequent step, the actuating arrangement 150 is operated in a second mode of operation.

In the second mode of operation, the actuating arrangement 150 is configured to move the mounting portion 156 of the caliper 102 and the engagement portion 160 of the carrier 101 towards each other. This is achieved by activating the actuating arrangement 150 such that the shaft 154 moves linearly along the axis 162 away from the engagement portion 160.

Movement of the shaft 154 away from the engagement portion 160 results in the actuating arrangement 150 applying a decreasing compressive force to the engagement portion 160. As the compressive force applied by the actuating arrangement 150 to the engagement portion 160 decreases, the mounting portion 156 of the caliper 102 and the engagement portion 160 of the carrier 101 are moved towards each other. This is because as the compressive force applied by the actuating arrangement 150 to the engagement portion 160 decreases, the mounting portion 156 of the caliper 102 moves towards the engagement portion 160 of the carrier 101 due to the reaction forces generated by bending of the guide pin 124a in the second configuration.

The actuating arrangement 150 is deactivated when the carrier 101 and the caliper 102 are in the first configuration in which the first longitudinal axis 115a of the bore 122a and the second longitudinal axis 117a of the guide pin 124a are aligned. It will be appreciated that by locating the mounting portion 156 in the outboard caliper portion 102b and the engagement portion 160 in the outboard carrier portion 101b, the compressive force that is required to be to be imparted by the actuating arrangement 150 to the engagement portion 160 in order to inhibit relative sliding between the caliper 102 and the brake carrier 101 is smaller relative to if the mounting portion 156 and the engagement portion 160 were located further inboard. This is due to the greater moment arm between the engagement portion 160 and the first caliper guide assembly 112a.

With reference to FIGS. 5 and 6, it can be seen that the engagement portion 160 is a surface of the outboard carrier portion 101b having a substantially constant profile along the second longitudinal axis 117a, which is parallel to the axial direction A-A in the first configuration. Said surface extends a distance w parallel to the second longitudinal axis 117a. In the illustrated embodiment, the engagement portion 160 is a planar surface of the outboard carrier portion 101b.

As friction material 209a, 209b on the brake pads 103a, 103b wears over repeated braking operations, the overall thickness of each brake pad 103a, 103b reduces in the axial direction A-A. As the thickness of the brake pads 103a, 103b reduces, the caliper 102 and thus the actuating arrangement 150 are moved to the right (i.e., the positive z-direction) in FIGS. 5 and 6 in order to maintain a consistent clearance between the rotor 140 and the outboard brake pad 103b.

The distance w of the engagement portion 160 is chosen to be sufficient to allow the actuating arrangement 150 to engage to the engagement portion 160 over the full range of thicknesses of each brake pad 103a, 103b from an unworn maximum thickness condition to a fully-worn minimum thickness condition. Hence, the actuating arrangement 150 is able to move the caliper 102 and the carrier 101 relative to each other over all wear conditions of the brake pads 103a, 103b.

The planar surface of the engagement portion 160 is substantially normal to the axis 162. As such, for a constant distance between the distal end 164 of the shaft 154 and the body 152 along the axis 162, the actuating arrangement 150 is able to apply a consistent force to the engagement portion 160 over all wear conditions of the brake pads 103a, 103b.

As previously discussed, the brake assembly 100 includes a second caliper guide assembly 112b. With reference to FIG. 2, the second guide assembly 112b includes a guide bore within the caliper 102 extending along a third longitudinal axis 115b and a guide pin secured to the brake carrier 101 extending along a fourth longitudinal axis 117b. It will be appreciated that similar to the first caliper guide assembly 112a, the third longitudinal axis 115b and the fourth longitudinal axis 117b are substantially aligned in the first configuration and unaligned in the second configuration.

With reference to FIGS. 2 and 4, it can be seen that the inboard carrier portion 101a and the outboard carrier portion 101b are connected by two bridging portions 107. The inboard carrier portion 101a, the outboard carrier portion 101b and the two bridging portions 107 define an aperture 109 (see FIG. 2) for receiving the rotor 140.

It can be seen by comparing FIGS. 2 and 4 that the engagement portion 160 is located substantially centrally on the outboard carrier portion 101b between the first caliper guide assembly 112a and the second caliper guide assembly 112b; i.e., the engagement portion 160 intersects a y-z plane which is parallel to and located substantially centrally between the first longitudinal axis 115a and the third longitudinal axis 115b and/or parallel to and located substantially centrally between the second longitudinal axis 117a and the fourth longitudinal axis 117b. Likewise, the mounting portion 156 and the actuating arrangement 150 are located on a corresponding substantially central portion of the outboard caliper portion 102b.

It should be noted that in the illustrated embodiment, the engagement portion 160 and the mounting portion 156 are not located exactly centrally between the first caliper guide assembly 112a and the second caliper guide assembly 112b, and are instead slightly offset from the exact center along the x-axis. However, in alternative embodiments (not shown), the, engagement portion 160 and the mounting portion 156 may be located exactly centrally between the first caliper guide assembly 112a and the second caliper guide assembly 112b.

Locating the engagement portion 160 and the mounting portion 156 substantially centrally on the outboard carrier portion 101b and the outboard caliper portion 102b respectively, helps to ensure that the frictional forces between the guide pin 124a and the bush 123a of the first caliper guide assembly 112a and the guide pin and the bush of the second caliper guide assembly 112b are similar in the second configuration. Advantageously, this helps to reduce wear of the components of the first and the second caliper guide assemblies 112a, 112b by ensuring that the frictional forces are distributed evenly when the actuating arrangement 150 is activated to inhibit the caliper 102 and the carrier 101 from sliding relative to each other.

Operation of the disc brake assembly 100 and, specifically of the actuating arrangement 150 will now be described.

During a braking operation, the disc brake assembly 100 is in the first configuration. As the actuation mechanism 122 moves the inboard brake pad 103a towards the rotor 140, the friction material 209a of the inboard brake pad 103a contacts the rotor 140. As the friction material 209a of the inboard brake pad 103a contacts the rotor 140, the inboard brake pad 103a will no longer advance. Instead, a reaction force passes through the inboard brake pad 103a and is transmitted to the caliper 102, causing the caliper 102 to slide relative to the brake carrier 101 in the inboard axial direction. The outboard brake pad 103b is engaged by the caliper 102, causing the outboard brake pad 103b to be moved in the direction of the rotor 140, and the friction material 209b of the outboard brake pad 103b to come into contact with the rotor 140, further restricting its rotation and slowing the vehicle.

After a braking operation, it is desired that the inboard brake pad 103a and the outboard brake pad 103b are moved away from the rotor 140 completely, as any contact of the friction material 209a of the inboard brake pad 103a or the friction material 209b of the outboard brake pad 103b with the rotor 140 will cause drag, leading to inefficiency of the vehicle due to the frictional forces that must be overcome to accelerate as well as premature wearing of the brake pads 103a, 103b and rotor 140, which must then be replaced earlier than otherwise necessary.

When the disc brake assembly 100 is no longer being actuated, the inboard brake pad 103a and the outboard brake pad 103b typically move away from the rotor 140 due to the uneven surface of the rotor 140 and low resistance of the first guide assembly 112a and second guide assembly 112b to sliding of the caliper 102, meaning only a small axial force is needed in order for the caliper 102 to slide relative to the brake carrier 101 in the opposite axial direction as during a braking operation.

The disc brake assembly 100 may include a positive pad retraction system (not shown), such as one or more positive pad retraction springs of a type known in the art interposed between the inboard brake pad 103a and the outboard brake pad 103b. Such positive pad retraction systems help ensure that the inboard brake pad 103a and the outboard brake pad 103b is moved away from the rotor 140 after a braking operation.

When the braking operation has ended and when the inboard brake pad 103a and the outboard brake pad 103b are spaced from the rotor 140, the actuating arrangement 150 is operated in the first mode of operation until the disc brake assembly 100 is in the second configuration in which relative sliding between the carrier 101 and the caliper 102 is inhibited. As such, the positions of the inboard brake pad 103a and the outboard brake pad 103b remain substantially fixed relative to the rotor 140 regardless of the forces exerted on the brake pads 103a, 103b during normal operation of the vehicle. Hence, outside of a braking operation, the brake pads 103a, 103b are inhibited from contacting the rotor 140.

Preferably, the actuating arrangement 150 is operated to inhibit relative sliding between the caliper 102 and the carrier 101 only once the inboard brake pad 103a and the outboard brake pad 103b are located equidistant from the rotor 140. This helps to ensure that the brake pads 103a, 103b wear evenly over the lifetime of the brake pads 103a, 103b.

When a subsequent braking operation is initiated, the actuating arrangement 150 is operated in the second mode of operation until the disc brake assembly 100 is in the first configuration in which the carrier 101 and the caliper 102 are free to slide relative to each other.

In the illustrated embodiment, the actuating arrangement 150 is self-locking. By self-locking it is meant that the actuating arrangement 150 can maintain the position of the shaft 154 relative to the body 152 without requiring electrical power. As such, when the actuating arrangement 150 is operated in the first mode of operation until the disc brake assembly 100 is in the second configuration, the actuating arrangement 150 does not require electrical power to maintain the disc brake assembly 100 in the second configuration.

In the event that the disc brake assembly 100 is in the second configuration and the actuating arrangement 150 does not have a power supply, the disc brake assembly 100 is still able to perform a braking operation. This is because the frictional forces between the actuating arrangement 150 and the engagement portion 160 are less than the force applied by the actuation mechanism 122 to the inboard brake pad 103a during a braking operation. As such, the force applied by the actuation mechanism 122 to the inboard brake pad 103a is sufficient to overcome the frictional forces between the actuating arrangement 150 and the engagement portion 160 and move the caliper 102 relative to the brake carrier along the axial direction.

In the illustrated embodiment, the actuating arrangement 150 is configured to determine wear conditions of the first caliper guide assembly 112a and/or the second caliper guide assembly 112b. In particular, the actuating arrangement 150 is configured to determine wear conditions of the guide bush 123a of the first caliper guide assembly 112a and/or the guide bush 123b of the second caliper guide assembly 112b.

To achieve this, as the actuating arrangement 150 moves the disc brake assembly 100 from the first configuration to the second configuration, the actuating arrangement 150 is configured to determine the displacement of the distal end 164 of the shaft 154 relative to the body 152. The greater the displacement of the distal end 164 relative to the body 152 required to prevent the caliper 102 sliding relative to the carrier 101, the greater the amount of wear of the guide bushes 123a, 123b must have occurred. This is because as the guide bushes wear over the life of the disc brake assembly 100, the clearance between the guide pins and the respective guide bushes increases. Therefore, to prevent the caliper 102 sliding relative to the carrier 101, the actuating arrangement 150 is required to move the caliper 102 and the carrier 101 away from each other by a greater amount to ensure sufficient frictional contact between the guide pins and the guide bushes, relative to if the guide bushes were in an unworn condition.

Information relating to the wear conditions of the first caliper guide assembly 112a and the second caliper guide assembly 112b may be sent to the vehicle (not shown) for display to the driver, via a wired connection or wirelessly. Additionally, or alternatively, such information may be stored in a memory device in the disc brake assembly 100 or in the vehicle.

Advantageously, the actuating arrangement 150 helps to inhibit wear of the first caliper guide assembly 112a and the second caliper guide assembly 112b by inhibiting rattling between the guide pins and the guide bushes when the disc brake assembly 100 is in the second configuration.

In the foregoing description, the actuating arrangement 150 is mounted to a mounting portion 156 of the caliper 102, and the actuating arrangement 150 is configured to engage an engagement portion 160 of the carrier 101. However, in alternative embodiments (not shown), with suitable modifications, the actuating arrangement 150 may be mounted to a mounting portion of the carrier 101 and the actuating arrangement 150 may be configured to engage an engagement portion of the caliper 102. In such embodiments, the mounting portion of the carrier 101 and the engagement portion of the caliper 102 may be on the outboard carrier portion 101b and the outboard caliper portion 102b respectively, or the inboard carrier portion 101a and the inboard caliper portion 102a respectively.

In the foregoing description, the actuating arrangement 150 is configured to apply an increasing compressive force to the engagement portion 160 in the first mode of operation and a decreasing compressive force to the engagement portion 160 in the second mode of operation.

However, in alternative embodiments (not shown), the actuating arrangement 150 may be configured to apply an increasing tensile force to the engagement portion 160 in the second mode of operation to move the mounting portion 156 and the engagement portion 160 towards each other in order to move from the first configuration to the second configuration. By "tensile force" it is meant a force applied by the actuating arrangement 150 to the engagement portion 160 in a direction from the engagement portion 160 to the actuating arrangement 150. Additionally or alternatively, the actuating arrangement 150 may be configured to apply a decreasing tensile force to the engagement portion 160 in the first mode of operation to move the mounting portion 156 and the engagement portion 160 away from each other in order to move from the second configuration to the first configuration.

Figure 8:
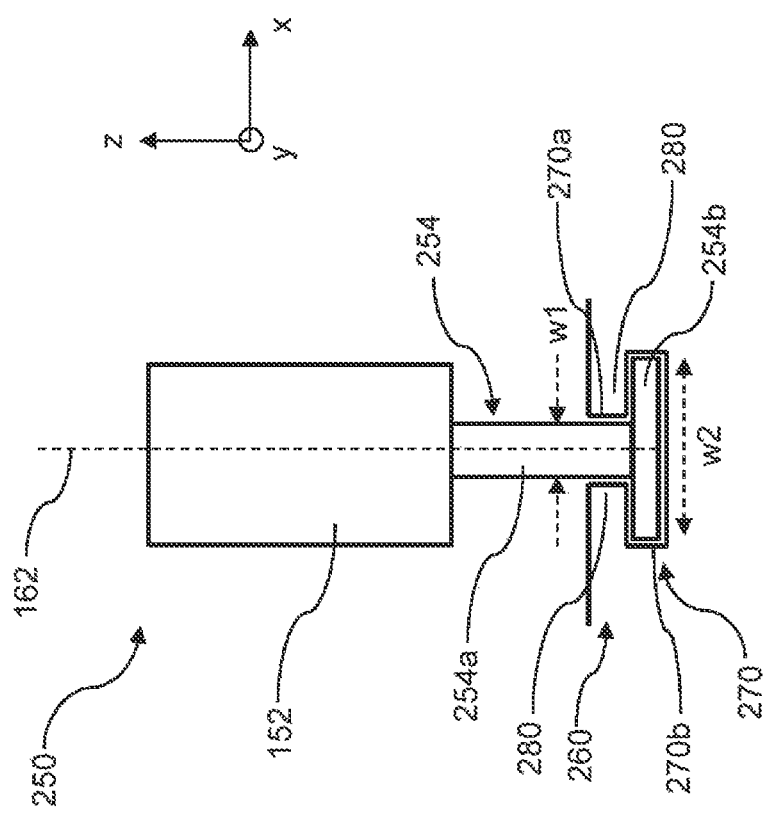
FIG. 8 is a schematic representation of a cross-sectional view of another embodiment of an actuating arrangement and an engagement portion.

FIG. 8 shows an alternative embodiment of an actuating arrangement 250 and an engagement portion 260. The arrangement shown in FIG. 8 allows the actuating arrangement 250 to apply a tensile force to the engagement portion 260.

The actuating arrangement 250 includes the body 152 and a shaft 254 with a T-shaped profile. The shaft 254 includes a proximal portion 254a having a first width w1, and a distal portion 254b having a second width w2. The second width w2 is greater than the first width w1.

The engagement portion 260 includes a T-shaped channel 270 having a constant cross-section profile in the axial direction A-A. The channel 270 includes a first channel portion 270a configured to receive the proximal portion 254a, and a second channel portion 270b configured to receive the distal portion 254b. The first channel portion 270a is defined by two walls 280 and has a width greater than the width w1 but less than the width w2. The second channel portion 270b has a width greater than the width w2.

In the embodiment shown in FIG. 8, in the second mode of operation, the actuating arrangement 250 is activated such that the shaft 254 moves away from the engagement portion 260 along the axis 162. As the shaft 254 moves away from the engagement portion 260, the distal portion 254b abuts against the walls 280 and thus applies an increasing tensile force to the engagement portion 260. In the first mode of operation, the actuating arrangement 250 is activated such that the shaft 254 moves towards the engagement portion 260 along the axis 162, and thus applies a decreasing tensile force or an increasing compressive force.

Since the channel 270 has a constant cross-sectional profile along the axial direction, the actuating arrangement 250 is free to move relative to the engagement portion 260 along the axial direction A-A. Hence, when the caliper 102 and the carrier 101 are in the first configuration, the actuating arrangement 250 and the engagement portion 260 do not impede the caliper 102 from sliding freely relative to the carrier 101 along the axial direction.

In the foregoing description, the actuating arrangement 150 is a linear actuator arranged to move the caliper 102 and the carrier 101 relative to each other via the application of mechanical compressive and tensile forces. However, in alternative embodiments (not shown), the actuating arrangement 150 may include an electromagnet arranged to move the engaging portion towards or away from the mounting portion via electromagnetic attraction or repulsion respectively. In such embodiments, the engaging portion may be formed from a magnetic material. Alternatively, the actuating arrangement 150 may form part of a cam mechanism. For example, the actuating arrangement 150 may include a rotary actuator that is configured to rotate an eccentric cam about the y-axis in the figures. An edge of the eccentric cam may engage the engaging portion such that rotation of the cam varies the spacing between the engaging portion and the mounting portion.

In the foregoing description, disc brake assembly 100 includes the first caliper guide assembly 112a including the guide pin 124a and the guide bore 122a, and the second caliper guide assembly 112b including a guide pin and a guide bore. In alternative embodiments (not shown), the disc brake assembly 100 may only include the first caliper guide assembly 112a. Alternatively, the first caliper guide assembly 112a and/or the second caliper guide assembly 112a may not include a guide pin and a guide bore. In such embodiments, the first caliper guide assembly 112a and/or the second caliper guide assembly 112b may include different sliding means which allow the caliper 102 to slide relative to the carrier 101. For example, the caliper 102 may include a formation such as a tongue which is arranged to be received within and engage a formation in the carrier 101 such as a groove. Said formations may be configured to allow the caliper 102 to slide with respect to the carrier 101 for clamping and release of the rotor 140 by the brake pads 103a, 103b along the axial direction A-A.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake assembly comprising:
   first and second brake pads arranged to face opposing faces of a brake rotor;
   a brake carrier arranged to receive at least the first brake pad;
   a caliper arranged to slide with respect to the brake carrier for clamping and release of the brake rotor by the first and second brake pads along a first longitudinal axis; and
   an actuating arrangement configured to selectively move the caliper and the brake carrier relative to each other generally transverse to the first longitudinal axis so as to lock or inhibit sliding of the caliper relative to the brake carrier.

2. The disc brake assembly of claim 1 wherein the actuating arrangement is mounted to a mounting portion of one of the caliper and the brake carrier, and wherein the actuating arrangement is configured to engage an engagement portion of the other of the caliper and the brake carrier.

3. The disc brake assembly of claim 2 wherein the actuating arrangement is configured to move the mounting portion and the engagement portion away from each other in a first mode of operation, and wherein the actuating arrangement is configured to move the mounting portion and the engagement portion towards each other in a second mode of operation.

4. The disc brake assembly of claim 3 wherein the actuating arrangement is configured to apply an increasing compressive force to the engagement portion in the first mode of operation and a decreasing compressive force to the engagement portion in the second mode of operation, or wherein the actuating arrangement is configured to apply an increasing tensile force to the engagement portion in the first mode of operation and a decreasing tensile force to the engagement portion in the second mode of operation.

5. The disc brake assembly of claim 2 wherein the engagement portion extends a distance in an axial direction, the distance sufficient to allow the actuating arrangement to engage the engagement portion across all wear conditions of the first and second brake pads.

6. The disc brake assembly of claim 5 wherein the engagement portion is a surface of one of the caliper and the brake carrier having a substantially constant profile in the axial direction.

7. The disc brake assembly of claim 6 wherein the engagement portion is a planar surface of one of the caliper and the brake carrier.

8. The disc brake assembly of claim 1 wherein the actuating arrangement is a linear actuator.

9. The disc brake assembly of claim 8 wherein the linear actuator is an electronic linear actuator.

10. The disc brake assembly of claim 9 wherein the linear actuator is a screw-driven linear actuator.

11. The disc brake assembly of claim 1 wherein the actuating arrangement is secured within a recess in the caliper or the brake carrier.

12. The disc brake assembly of claim 11 wherein the actuating arrangement is bolted to or press-fitted within the recess.

13. The disc brake assembly of claim 1 wherein the caliper comprises a first guide bore extending along the first longitudinal axis,
   wherein the disc brake assembly comprises a first guide pin secured to the brake carrier, the first guide pin extending along a second longitudinal axis and being received within the first guide bore,
   wherein the first guide bore and the first guide pin are configured such that the caliper is slidable relative to the brake carrier when the first longitudinal axis is substantially aligned with the second longitudinal axis,
   wherein the actuating arrangement is configured to move the caliper and the brake carrier relative to each other between a first configuration in which the first longitudinal axis and the second longitudinal axis are substantially aligned, and a second configuration in which the first longitudinal axis and the second longitudinal axis are unaligned, and
   wherein the caliper and the brake carrier are locked or inhibited from sliding relative to each other in the second configuration.

14. The disc brake assembly of claim 13 wherein the caliper comprises a second guide bore, the second guide bore extending along a third longitudinal axis, wherein the disc brake assembly further comprises a second guide pin secured to the brake carrier, the second guide pin extending along a fourth longitudinal axis and received in the second guide bore, wherein the third longitudinal axis and the fourth longitudinal axis are substantially aligned in the first configuration and unaligned in the second configuration.

15. The disc brake assembly of claim 2 wherein the brake carrier comprises an inboard carrier portion and an opposite outboard carrier portion and the caliper comprises an inboard caliper portion and an opposite outboard caliper portion, wherein the disc brake assembly includes a caliper guide assembly comprised in and/or mounted to the inboard carrier portion and the inboard caliper portion, the caliper guide assembly configured such that the caliper is slidable with respect to the brake carrier along the first longitudinal axis, wherein one of the outboard caliper portion and the outboard carrier portion comprises the mounting portion, and wherein the other of the outboard caliper portion and the outboard carrier portion comprises the engagement portion.

16. A method for inhibiting relative sliding between a caliper and a brake carrier of a brake assembly, the method comprising the steps of:
   activating an actuating arrangement to move the caliper and the brake carrier relative to each other from a first configuration, in which the caliper is free to slide relative to the brake carrier along a first longitudinal axis, to a second configuration, in which the caliper is locked or inhibited from sliding relative to the brake carrier, wherein the caliper and the brake carrier are moved relative to each other in a direction transverse to the first longitudinal axis from the first configuration to the second configuration.

17. The method of claim 16 further comprising the step of:
   activating the actuating arrangement to move the caliper and the brake carrier relative to each other from the second configuration to the first configuration.

* * * * *